Mar. 13, 1923.
J. G. VINCENT
HYDROCARBON MOTOR
Filed Dec. 20, 1919
1,448,682
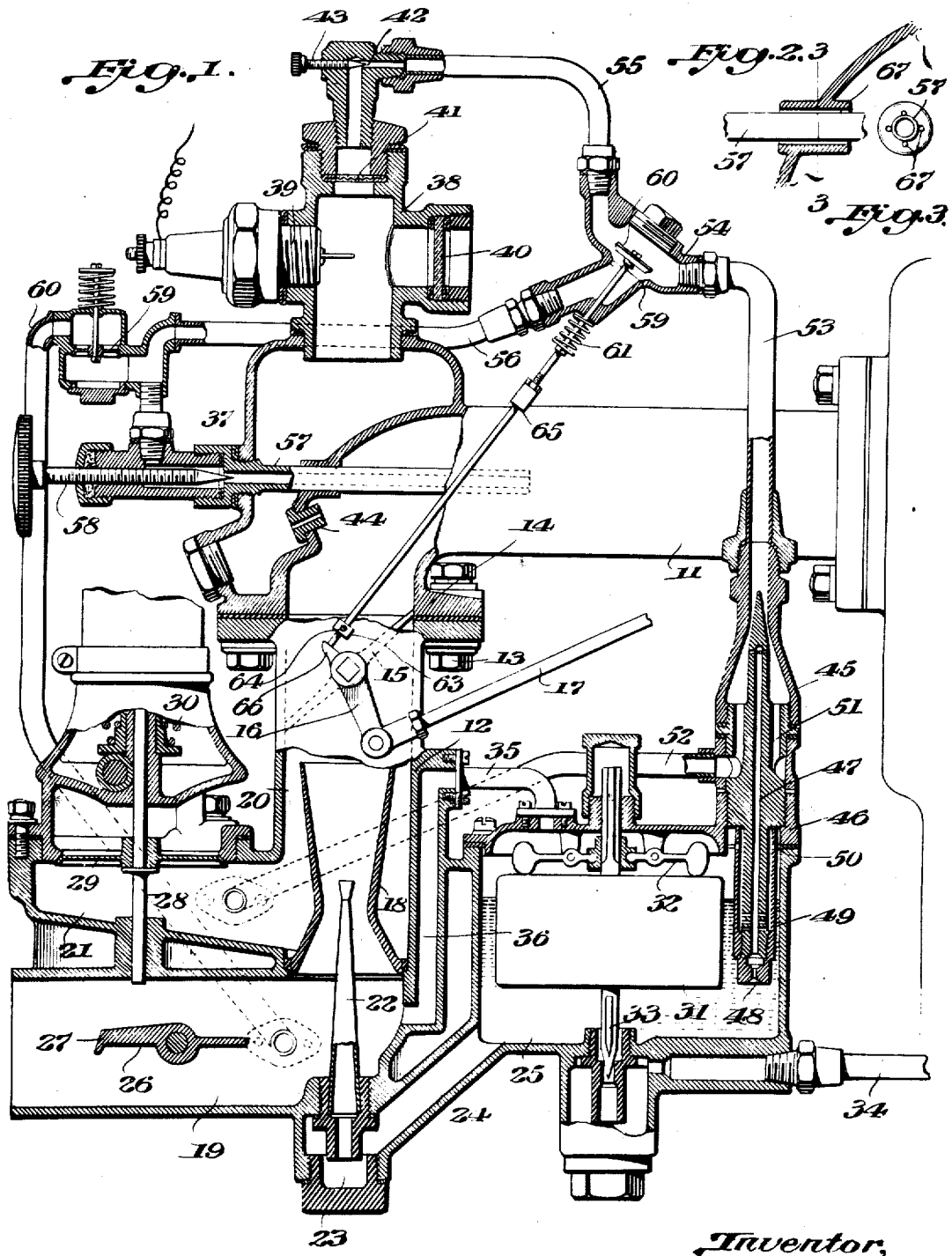
Inventor,
Jesse G. Vincent,
By Milton Pikketts
Atty.

Patented Mar. 13, 1923.

1,448,682

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed December 20, 1919. Serial No. 346,355.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to hydrocarbon motors, and particularly to carbureting and mixture heating devices therefor.

One of the objects of the present invention is to provide an auxiliary carburetor for supplying an idling mixture to the motor, as well as a suitable mixture for a combustion heater connected to the motor Another object of the invention is to provide an idling mixture separate from the mixture supplied by the main carburetor, together with means for heating the idling mixture before it enters the intake conduit.

Other objects and advantages of the invention will appear from the following description taken in connection with the drawings which form a part of this specification, and in which—

Figure 1 is a view mostly in vertical section showing a hydrocarbon motor and carbureting and mixture heating means made in accordance with this invention;

Figure 2 is a detail view showing a modified form of idling tube connection; and Figure 3 is a transverse section on the line 3—3 of Figure 2.

Referring to Figure 1 of the drawings, 10 is a cylinder block of a hydrocarbon motor, four or six cylinders usually being cast in a single block, and 11 the intake conduit or intake header by which the combustible mixture is conveyed to the inlet valves of the motor.

A carburetor 12 of the auxiliary air valve type is shown connected, as by bolts 13, to the downwardly turned end 14 of the intake conduit 11. The upper part of this carburetor in fact forms a continuation of the intake conduit and a throttle valve 15 is arranged therein, this valve being controlled by the operator through an arm 16 and a link 17. The throttle valve is of butterfly form and is adapted to close the passage tightly when in the position shown in the drawing.

The carburetor illustrated is, in most respects, like the well known Packard carburetor having a vertical mixture tube 18 supplied from a main air inlet 19, a passage 20 around the outside of the mixing tube 18, supplied by an auxiliary air intake 21, and a fuel nozzle 22 supplied from a well 23 connected through an inclined channel 24 with a float chamber 25. The main air intake 19 may be closed for choking by a butterfly valve 26, the foot 27 of which, in closing, abuts against the lower end of the stem 28 of an auxiliary air valve 29 which controls the air intake 21. The valve 29 is normally held in closed position by one or more springs 30.

The float chamber 25 above referred to controls the level of gasoline or other fuel in the nozzle 22, the means for this purpose comprising a float 31 acting on one or more levers 32 to keep a needle valve 33 closed as long as the liquid in the chamber is at a predetermined height. Gasoline is supplied to the float chamber from any suitable source through a pipe 34. The upper part of the float chamber is maintained at atmospheric pressure by means of a pipe 35 and a conduit 36 which connects the air compartment of the float chamber with the main air intake 19 of the carburetor. Thus choking of the main air intake of the carburetor also chokes the air compartment of the float chamber, and in case of any flooding in the float chamber the surplus liquid will drain through the conduit 36 to the main air intake of the carburetor, where it will be led to the ground or elsewhere, as desired.

For the purpose of heating the mixture passing from the carburetor 12 to the motor through the intake conduit 11, a combustion heater is provided in connection with the intake conduit. This heater comprises a chamber 37, in the upper wall of which is mounted a casting 38 having a spark plug 39, a window 40, a screen 41 and intake channel 42. The latter is controlled by a needle valve 43 to limit the amount of mixture passing to the combustion heater. The outlet from the combustion chamber 37 is shown at 44, being in the intake conduit above the throttle so that the combustion chamber is constantly open to suction from the motor.

For supplying the combustion heater with a suitable mixture that may be ignited by the spark plug 39, a carburetor 45 is provided, this carburetor being shown as mounted on the cover 46 of the float chamber 25 above referred to. This auxiliary or secondary carburetor has a fuel tube 47 extending down into the fuel in the float chamber 25, having connection with said fuel through openings 48 and 49. It also has air ports at 50 which are open to the air compartment of the float chamber, and air ports 51 which connect through a pipe 52 with the auxiliary air intake 21 of the main carburetor.

The mixture from the carburetor 45 passes through a pipe 53 to a union 54 and a pipe 55 to the intake channel 42 of the combustion heater, this mixture being drawn through these connections into the combustion heater by the suction of the motor. The spark plug 39 explodes the mixture in the combustion heater and the burnt gases are expelled through the outlet 44 above referred to. Thus the heater not only heats the mixture in the intake conduit by reason of its close proximity thereto, but the hot burnt gases also pass into the intake conduit and thereby come into direct contact with the mixture and heat it to a point where it is a dry gas and thereby easily fired in the motor.

In order that the carburetor 12 may be more closely adapted for the high speeds or full loads of the motor, the present invention contemplates eliminating the necessity of attempting to adapt the main carburetor to idling uses by providing an auxiliary means for supplying combustible mixture to the motor for idling. This is accomplished by using some of the mixture of the auxiliary or secondary carburetor 45 for this purpose. A pipe 56 leads from the union or branch 54 to a pipe 57 which passes through the combustion chamber 37 and into the intake conduit 11. The amount of this mixture is controlled by a needle valve 58, and a spring closed air valve 59 determines the amount of auxiliary air that may be supplied to this mixture from a pipe 60 which leads to the main air intake 19 of the main carburetor. Thus this air pipe 60 is choked when the main carburetor is choked.

It will be seen that since the idling mixture pipe 57 passes directly through the combustion chamber 37, the heat of the combustion chamber will be applied directly to heat the idling mixture, and to further carry out this idea the outlet 44 from the combustion chamber is directed towards the pipe 57 so that the hot burnt gases will play on that pipe and thereby further heat the idling mixture.

Usually there will be no reason for regulating the relative amount of mixture passing to the idling pipe 57, except as this may be done by the adjustable needle valves 43 and 58, but in some cases it may be desirable to cut out of action the idling mixture pipe when the throttle valve is opened so that the adjustment of the main carburetor 12 may not be interfered with by the action of the auxiliary carburetor or the air valve 59. To permit of this operation a valve seat 59 is provided in the branch 54 and a valve 60 is yieldingly held by a spring 61 against said seat. This valve, therefore, will normally close the pipe 56 leading to the idling pipe 57 and only the combustion heater will then draw mixture from the auxiliary carburetor 45. The valve 60 may be maintained in its open position, however, by a rod 62 extending to a fixed lug 63 in which is a set screw 64. Thus by pushing the valve open and setting the screw 64 against the rod 62, the valve 60 may be maintained in its open position. The rod 62 connects with the stem of the valve 60 through an adjustable turnbuckle 65 so that its open position may be readily set.

If it is desired to have the valve 60 held in open position when the throttle valve 15 is closed and allowed to close when the throttle valve 15 is opened, an arm 66 may be arranged on the shaft of the throttle valve so that it will abut against the end of the rod 62 as shown in the drawing, when the throttle valve 15 is moved to closed position. In the drawing the valve 15 is fully closed and the valve 60 is open so that the carburetor 45 supplies both the combustion heater 37 and the idling tube 57. By moving the throttle valve 15 to open it the arm 66 will be moved out of contact with the end of the rod 62 and the valve 60 will be closed by the spring 61. The auxiliary carburetor 45 will then supply only the heater 37 and the motor will be fed by the main carburetor 12, which latter will not be interfered with in any way by mixture from the idling tube.

Referring to Figures 2 and 3, it will be seen that the opening through which the idling tube 57 passes into the intake conduit has a series of channels 67 formed in it so that when the tube 57 is in place these channels will form outlets similar to the outlet 44. However, these channels 67 are immediately surrounding and parallel to the idling tube so that the heat from the burnt gases passing through these channels 67 will be more directly transferred to the idling tube to thereby heat the idling mixture passing therethrough.

Other forms of the invention may be made without departing from the spirit or scope thereof, as more particularly described in the claims.

Having thus described my invention, what I claim and desire to secure by Letters Patent is:

1. In a hydrocarbon motor, the combination with the intake conduit thereof, of a main carburetor connected to said conduit, a combustion heater for supplying heat to said conduit, and an auxiliary carburetor connected to said conduit for idling the motor and to said heater.

2. In a hydrocarbon motor, the combination with the motor intake conduit, of a carburetor, a combustion heater, and a pipe connected to said carburetor and having branches connected to said heater and to said conduit.

3. In a hydrocarbon motor, the combination with the motor intake conduit, of a carburetor, a combustion heater, a branch pipe connected to said carburetor and to said heater and said conduit, and a valve at the branch of said pipe.

4. In a hydrocarbon motor, the combination with the motor intake conduit, of a combustion heater connected thereto, a main carburetor for supplying mixture to the intake conduit for normal running, and a pipe for supplying mixture to the intake conduit for idling, said pipe passing through said combustion heater.

5. In a hydrocarbon motor, the combination with a motor intake conduit, of means for supplying mixture thereto for normal running, and means for supplying mixture to the conduit for idling, and a heater device for said idling supply means.

6. In a hydrocarbon motor, the combination with the intake conduit thereof, of a combustion heater, a single means for supplying mixture to said heater and to the conduit for idling purposes, and means for adding air to that part of the mixture supplied to the intake conduit for idling.

7. In a hydrocarbon motor, the combination with the motor intake conduit, of a pipe extending into said conduit and adapted to supply mixture thereto for operating the motor, a combustion heater, and outlet means for said heater into said intake conduit directed towards said pipe.

8. In a hydrocarbon motor, the combination with the motor intake conduit and a combustion heater, of a carburetor, piping leading from said carburetor to said heater and said conduit, and a spring closed air valve connected to said piping for supplying additional air to the mixture entering said conduit.

9. In a hydrocarbon motor, the combination with the intake conduit thereof, of a combustion heater connected thereto, means for supplying mixture to said conduit for idling the motor, said means passing through said combustion heater.

10. In a hydrocarbon motor, the combination with the motor intake conduit, of a pipe for supplying mixture to said conduit, said pipe extending through a wall of said conduit, and a combustion heater surrounding a portion of said pipe and having its outlet into said conduit comprising elongated channels surrounding said pipe.

11. In a hydrocarbon motor, the combination with the motor intake conduit, of a pipe for supplying mixture to said conduit, said pipe extending through a wall of said conduit, and a combustion heater surrounding a portion of said pipe and having its outlet in the form of channels parallel and adjacent to said pipe.

12. In a hydrocarbon motor, the combination with the intake conduit and a throttle valve therein, of a combustion heater, a carburetor connected to said combustion heater and to said conduit for supplying the latter with mixture for idling, a valve in said connection, and interconnections between said valve and said throttle valve.

13. In a hydrocarbon motor, the combination with the motor intake conduit and a throttle valve therefor, of a main carburetor connected to supply mixture thereto for normal operation, a combustion heater connected to said conduit, a secondary carburetor, piping from said secondary carburetor to said combustion heater and to said conduit for idling the motor, a valve in said piping, and connections between said valve and said throttle valve whereby both the heater and said conduit are supplied from said secondary carburetor when said throttle valve is closed and only the heater is supplied when said throttle valve is opened.

In testimony whereof I affix my signature.

JESSE G. VINCENT.

DISCLAIMER.

1,448,682.—*Jesse G. Vincent*, Detroit, Mich. HYDROCARBON MOTOR. Patent dated March 13, 1923. Disclaimer filed May 3, 1928, by the assignee, *Packard Motor Car Company*.

Hereby enters this disclaimer to claims 1 and 5 of said Vincent patent and disclaims any construction covered by claims 6 and 8 except those constructions in which the idling mixture is conducted from the auxiliary carburetor to the engine intake separately from the combustion products from the heater.

[*Official Gazette June 5, 1928.*]